(No Model.)

E. W. COX.
Rope Fastener.

No. 239,317.          Patented March 29, 1881.

WITNESSES:
S. Strothart
F. E. Zerbe

INVENTOR:
Edward W. Cox,
BY J. S. Zerbe,
ATTORNEY.

N. PETERS, PHOTO-LITHOGRAPHER, WASHINGTON, D.C.

UNITED STATES PATENT OFFICE.

EDWARD W. COX, OF CINCINNATI, OHIO.

ROPE-FASTENER.

SPECIFICATION forming part of Letters Patent No. 239,317, dated March 29, 1881.

Application filed August 9, 1880. (No model.)

*To all whom it may concern:*

Be it known that I, EDWARD W. COX, of Cincinnati, in the county of Hamilton and State of Ohio, have invented a new and useful Improvement in Rope-Fasteners, which improvement is fully set forth in the following specification and accompanying drawings, in which—

Figure 1:
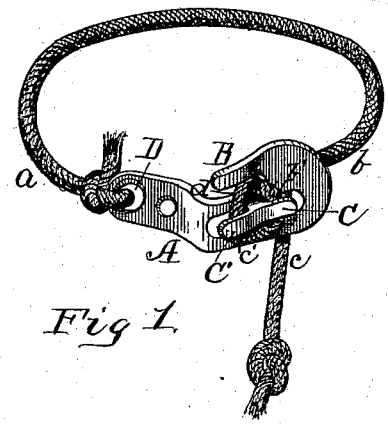
Figure 2:
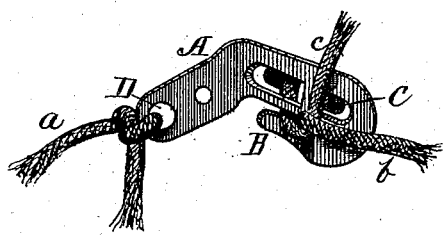

Figure 1 is a front perspective view of the fastener, and Fig. 2 is a rear perspective.

The object of this invention is to provide a simple and inexpensive line or rope holder, or to be used as a bag-tie, or for other purposes where it is designed to fasten the ends of rope or twine.

In the accompanying drawings, A represents a flat piece of metal bent in the middle portion to allow it to conform to the curve or circle of the bag or other object against which it rests when in use. When the tie is desired for use on flat objects the metal piece A can be left flat. A hook, B, is formed on one side and of the same piece of metal, and this is bent outwardly slightly to allow sufficient space for a cord to rest between the hook and the object against which the plate rests. On the outer surface, alongside of the hook B, are two oppositely-projecting hooks, C, having their bases together, and at the opposite end an aperture or eye, D, is formed through the plate, to which the rope or twine $a$ is attached.

In using this fastener the plate A is placed in the proper position, and the twine $a$ wrapped around the object, the end $b$ passed under the opposite end of the plate and engaged with the hook B. The end $c$ can then be drawn so as to tighten the twine around the object, after which it is passed under the hook C at $b'$, wrapped around its base, and pressed under the opposite hook, C'; thence under the hook B at $d$, and secured between the twine $b$ and the plate A. The twine $b$, therefore, presses the end $c$ against the plate A, and prevents it from slipping.

The plate, being constructed of one piece of metal, can easily be stamped out, thus greatly cheapening and facilitating the manufacture of the same.

I am aware that belaying-cleats have been used as a means of fastening ropes; but I am not aware that a plate constructed as herein shown, with a hook on one side and a belaying-cleat on the outer surface formed of one piece of metal, and adapted to receive the rope or twine in the peculiar manner specified, has ever before been known or used. Therefore, Having described my invention, what I claim as new, and desire to secure by Letters Patent, is—

In a rope or twine holder, the combination of an oblong plate, A, having a single hook, B, on the side, near one end, and by the side of said hook, on the outer surface of the plate, the double horn or belaying-cleat C C', the whole being made of one piece of metal, with the rope or twine, substantially as and for the purpose herein set forth.

In testimony that I claim the foregoing I have hereunto set my hand this 5th day of August, A. D. 1880, in the presence of witnesses.

EDWARD W. COX.

Witnesses:
J. S. ZERBE,
S. STROBHART.